(12) United States Patent
Liermann et al.

(10) Patent No.: US 10,288,815 B2
(45) Date of Patent: May 14, 2019

(54) FIBER MOUNTING UNITS AND FIBER RECEIVING ELEMENTS

(71) Applicant: TRUMPF Laser GmbH, Schramberg (DE)

(72) Inventors: Martin Liermann, Villingen-Schwenningen (DE); Andreas Enzmann, Villingen-Schwenningen (DE); Aleksander Budnicki, Gundelfingen (DE); Florian Jansen, Villingen-Schwenningen (DE); Johannes Overbuschmann, Hausach (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 15/958,280

(22) Filed: Apr. 20, 2018

(65) Prior Publication Data

US 2018/0246280 A1    Aug. 30, 2018

Related U.S. Application Data

(63) Continuation of application No. PCT/EP2016/074970, filed on Oct. 18, 2016.

(30) Foreign Application Priority Data

Oct. 21, 2015   (DE) .......................... 10 2015 013 689

(51) Int. Cl.
  *G02B 6/36*   (2006.01)
  *H01S 3/067*   (2006.01)
  (Continued)

(52) U.S. Cl.
  CPC ........ *G02B 6/3636* (2013.01); *H01S 3/06704* (2013.01); *H01S 3/06754* (2013.01);
  (Continued)

(58) Field of Classification Search
  CPC .. G02B 6/3636; G02B 6/3656; G02B 6/4266; H01S 3/06704
  See application file for complete search history.

(56) References Cited

U.S. PATENT DOCUMENTS 6,144,792 A    11/2000   Kim et al.
6,661,962 B1 * 12/2003   Calvet .................. G02B 6/3656
                                              385/134
(Continued)

FOREIGN PATENT DOCUMENTS

DE       19747145        7/1998
DE       10200603868     3/2007
(Continued)

OTHER PUBLICATIONS

Anonymous, "Micro Block Fiber Alignment Solutions," Melles Griot, 1997-1998, 3 pages.
(Continued)

*Primary Examiner* — Daniel Petkovsek
(74) *Attorney, Agent, or Firm* — Fish & Richardson P.C.

(57) ABSTRACT

Fiber mounting units for supporting an optical fiber for fiber laser systems are disclosed and include a base body having a fiber end attachment section, a fiber guide section, and a connection section arranged between the fiber end attachment section and the fiber guide section. The fiber end attachment section is adapted to attach a receiving element, which holds a fiber end portion of the optical fiber, the fiber guide section is adapted to guide a fiber central portion of the optical fiber, and the connection section is configured as a flexure bearing between the fiber end attachment section and the fiber guide section.

22 Claims, 8 Drawing Sheets

(51) Int. Cl.
    *H01S 3/04*     (2006.01)
    *H01S 3/042*    (2006.01)
    *G02B 6/42*     (2006.01)
    *H01S 3/00*     (2006.01)

(52) U.S. Cl.
    CPC .......... *G02B 6/3656* (2013.01); *G02B 6/4266* (2013.01); *H01S 3/005* (2013.01); *H01S 3/042* (2013.01); *H01S 3/0405* (2013.01)

(56) References Cited

U.S. PATENT DOCUMENTS

| | | | | |
|---|---|---|---|---|
| 6,925,234 | B2* | 8/2005 | Alexeev | G02B 6/4219 |
| | | | | 385/52 |
| 7,270,022 | B2 | 9/2007 | Devenyl | |
| 8,917,963 | B2* | 12/2014 | Pezeshki | G02B 6/4204 |
| | | | | 385/52 |
| 9,014,220 | B2 | 4/2015 | Minelly et al. | |
| 9,400,367 | B2 | 7/2016 | Erbe et al. | |
| 9,921,168 | B2* | 3/2018 | Gapontsev | B23K 26/707 |
| 2003/0133686 | A1 | 7/2003 | Delrosso et al. | |
| 2004/0223721 | A1 | 11/2004 | Flanders et al. | |
| 2011/0222148 | A1 | 9/2011 | Oota | |
| 2015/0110136 | A1* | 4/2015 | Schusslbauer | H01S 3/06704 |
| | | | | 372/6 |

FOREIGN PATENT DOCUMENTS

| | | |
|---|---|---|
| DE | 102013109185 | 5/2014 |
| EP | 0800246 | 10/1997 |
| FR | 2837290 | 9/2003 |
| WO | WO 01/91252 | 11/2001 |

OTHER PUBLICATIONS

International Search Report and Written Opinion in International Application No. PCT/EP2016/074970, dated Feb. 17, 2017, 15 pages (with English translation).

* cited by examiner

FIBER MOUNTING UNITS AND FIBER RECEIVING ELEMENTS

CROSS REFERENCE TO RELATED APPLICATIONS

This application is a continuation of and claims priority under 35 U.S.C. § 120 from PCT Application No. PCT/EP2016/074970 filed on Oct. 18, 2016, which claims priority from German Application No. DE 10 2015 013 689.5, filed on Oct. 21, 2015. The entire contents of each of these priority applications are incorporated herein by reference.

TECHNICAL FIELD

This disclosure relates to fiber laser systems and fiber mounting units as well as fiber cooling cartridges specially designed for fiber cooling as well as fiber receiving elements used therein.

BACKGROUND

In continuous or long laser pulse emitting fiber laser amplifier systems, seed and pump radiation are typically supplied and guided away monolithically via passive transport fibers of the fiber amplifier unit.

In short pulse and ultrashort pulse fiber laser amplifier systems, the use of passive transport fibers is possible only to a limited extent, if at all, because the high intensities present in the fiber core (e.g., in passive transport fibers) can lead to non-linear effects. These effects can lead to self-phase modulation, which can destroy the pulse quality. With a chirped pulse amplification (CPA) laser system, such phase-modified pulses can no longer, or only incompletely, be compressed.

Alternatively, U.S. Pat. No. 9,014,220 B discloses a free-beam coupling. However, this coupling requires positioning optical components in relation to each other, where the positioning requires high accuracy and stability. Especially with thermal loads such as those due to fluctuations of the outside temperature during transport and waste heat created by the laser process itself (for example, by absorption, quantum defect, and photo-darkening) there can be strains or spatial changes within the fiber laser configuration. The latter can lead to deteriorations and instabilities when coupling in or out, whereby the coupling in is usually more critical for the performance of the fiber laser amplifier system.

SUMMARY

This disclosure relates to fiber laser amplifier systems and fiber mounting units for such fiber laser amplifier systems that provide low or reduced thermal susceptibility.

In some embodiments of the present disclosure, a fiber mounting unit for providing an optical fiber for a fiber laser amplifier system includes a base body having a fiber end attachment section, a fiber guide section, and a connection section between the fiber end attachment section and the fiber guide section. The fiber end attachment section is adapted to attach a receiving element that holds a fiber end portion of the optical fiber, and the fiber guide section is adapted to guide a fiber central portion of the optical fiber. The connection section can be adapted as a flexure bearing between the fiber end attachment section and the fiber guide section.

In some embodiments, a fiber receiving element comprises a bottom unit extending along a longitudinal direction. The bottom unit is adapted for attachment to a fiber end attachment section of a fiber mounting unit as mentioned above. Furthermore, the fiber receiving element comprises a covering unit, which can be fixed on the bottom unit to at least partially cover the bottom unit. The bottom unit and the covering unit are adapted to receive an end section of an optical fiber so that the end section extends along the longitudinal direction and a fiber end of the optical fiber is positionable at a coupling side of the bottom unit in a free-beam coupling position.

In some embodiments, the support can be configured such that the free-beam coupling position remains stationary even in the event of thermally-induced volume changes.

In some embodiments, a fiber laser unit (e.g., a fiber laser amplifier unit or a laser oscillator) comprises an optical plate, a fiber mounting unit such as described above having a fiber guide section and a fiber end attachment section, an optical fiber, and a receiving element receiving an end of the optical fiber, the receiving element being attached to the fiber end attachment section.

The following exemplary features can be available in amplifier units of the different laser power classes, including flexure bearings to ensure degrees of freedom of movement for compensation of thermal deformation(s), or flexure bearings mounted only at the input coupling side or only at the output coupling side or on both sides of a cartridge base body. A tubular absorber sleeve is at a side opposite the pump coupling for absorbing pump light not absorbed in the amplifier fiber. UKP systems typically use short fibers to keep nonlinearities small. It is advantageous to couple the pump light at the signal output side to keep the effective absorption length of the active fiber as short as possible. Thereby, non-absorbed pump light can escape at the opposite seed coupling side. Due to the large numerical aperture of typical active fibers, this pump light has a strong divergence. When using an absorber sleeve that absorbs the highly divergent components of the non-absorbed pump light, the free apertures in the system can be limited and one can work with small optical elements. This has a positive effect on the stability of the input coupling. The low-divergence components of the pump light are thereafter absorbed with classical absorber components (e.g., dichroic mirror and absorber). To facilitate heat dissipation, the absorber sleeve can be made of a material with a high thermal conductivity (e.g., copper or aluminum) and can also have with absorbent layer and/or have a material structure of the inner surface.

To minimize mechanical stresses on the fiber, fiber guide grooves in the fiber mounting unit can allow a tension-free fiber path. For example, a spiral with a constant gradient allows the optical fiber at the intersection point to run in different planes—thus, without contact—and therefore not exert any interacting stresses.

Fan-like grooves (guide webs) can be integrated into the fiber support surface to compensate for different fiber lengths due to tolerances and production.

A coating of the fiber can be removed or a mode-stripper can be attached close to the fiber ends, so as not to couple out light guided in the pump layer at the fiber surface.

Several features can be present in amplifier units with lower powers (e.g., a few to several tens of watts (W) of average power), including a flexure bearing connection only on the coupling side. Also, the amplifier units can include a water-cooled support element for holding an absorber sleeve (for example, an aluminum sleeve) and a coupling lens, whereby through contact with the fiber receiver and the fiber support, the fiber itself is air-cooled, e.g., cooled only indirectly via contact heat dissipation.

Several features can be present in amplifier units with high powers (e.g., from approximately 50 W average power to several hundred W average power), including flexure bearings at the input coupling and output coupling sides. A cooled element can hold the fiber end, whereby the cooling can take place either via a heat sink with cooling channels or via a direct (circumferential) flushing of the fiber with a coolant (e.g., water).

A three-point support of the mounting element can ensure that the outlet facet or the fiber ends are kept locally stable even under thermal expansion. One can embed the (active optical) fiber in a typically (water-) cooled unit/cartridge (e.g., made of aluminum) for stress-free receiving without causing constraining forces. For improved thermal connection, the fiber can be cast typically with an optically transparent and heat-conducting material (e.g., silicone). The material typically has a high thermal conductivity to simplify heat dissipation. A fiber inlet and fiber outlet can be at the same beam height by tilting the fiber guide surface, e.g., the geometry of the recess.

DESCRIPTION OF DRAWINGS

Herein, concepts are disclosed for improved methods and systems for thermally decoupling fiber mounting units (e.g., fiber mounting/fiber cooling cartridges). Additional features and their functions result from the following description of embodiments on the basis of the drawings. The drawings show.

DETAILED DESCRIPTION

Aspects described herein are partly based on the realization that mechanically decoupling an input coupling or output coupling unit mounted on a fiber cartridge from thermal deformations of a fiber mounting unit is made possible by providing flexure bearings in the fiber mounting unit. Such flexure bearing-based embodiments can provide spatial stability of the input coupling with regard to thermal expansion during operation of the fiber laser amplifier system as well as during transport.

Furthermore, the mounting embodiments disclosed herein can keep the position of a fiber end stable with respect to the positions of the optical components under thermal expansion. Furthermore, the stability can be increased by a special bearing of a fiber receiving element—especially at higher powers and, thus, at potentially larger thermal deformations.

FIGS. 1 to 14 illustrate an embodiment that can be used in high power fiber laser amplifier systems. Higher powers in this context range from tens of watts to several hundred watts (average power). The features, when reduced or selected in their scope, can be applied analogously in fiber laser amplifier systems with low and medium power. Low and medium power ranges in this context are from a few watts up to approximately 50 W (average power). Such embodiments of fiber laser amplifier systems with low and medium power are described in connection with FIGS. 14 to 17.

Figure 7:
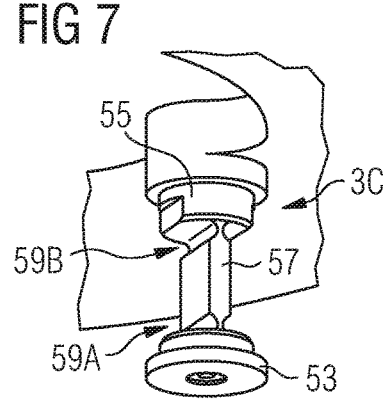
FIG. 7 is a perspective view of a flexure bearing mount.
Figure 8:
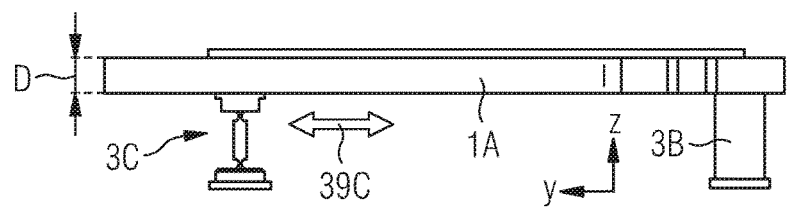
FIG. 8 is a schematic side view of the fiber mounting unit shown in FIG. 4.
Figure 9:
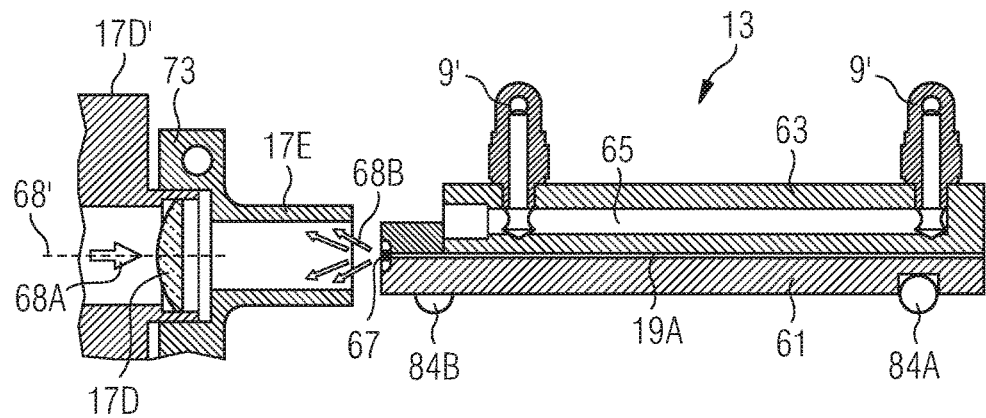
FIG. 9 is a cross section of a fiber receiving element with optical input coupling elements for a high power fiber laser amplifier system.
Figure 10:
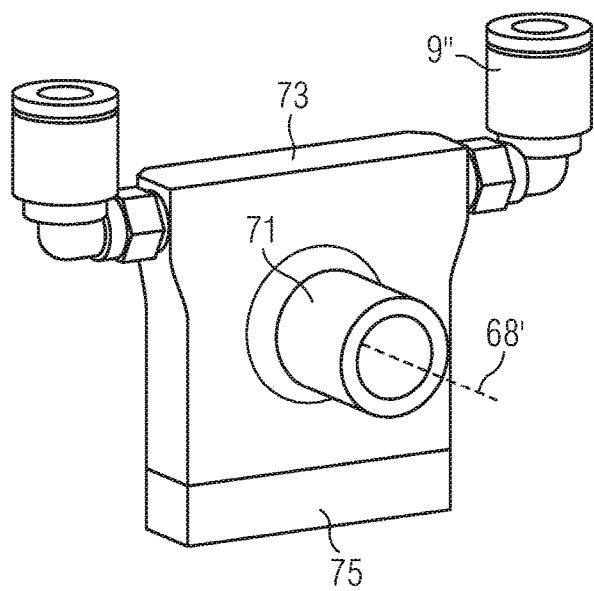
FIG. 10 is a schematic 3D illustration of an absorber sleeve.

FIGS. 1 to 8 illustrate flexure bearings for fiber receiving units. FIGS. 9 and 10 relate to components for the absorption of exiting unused pump light, and FIGS. 11A to 13 relate to a fiber receiving element for position compensation during thermal expansion.

Figure 1:
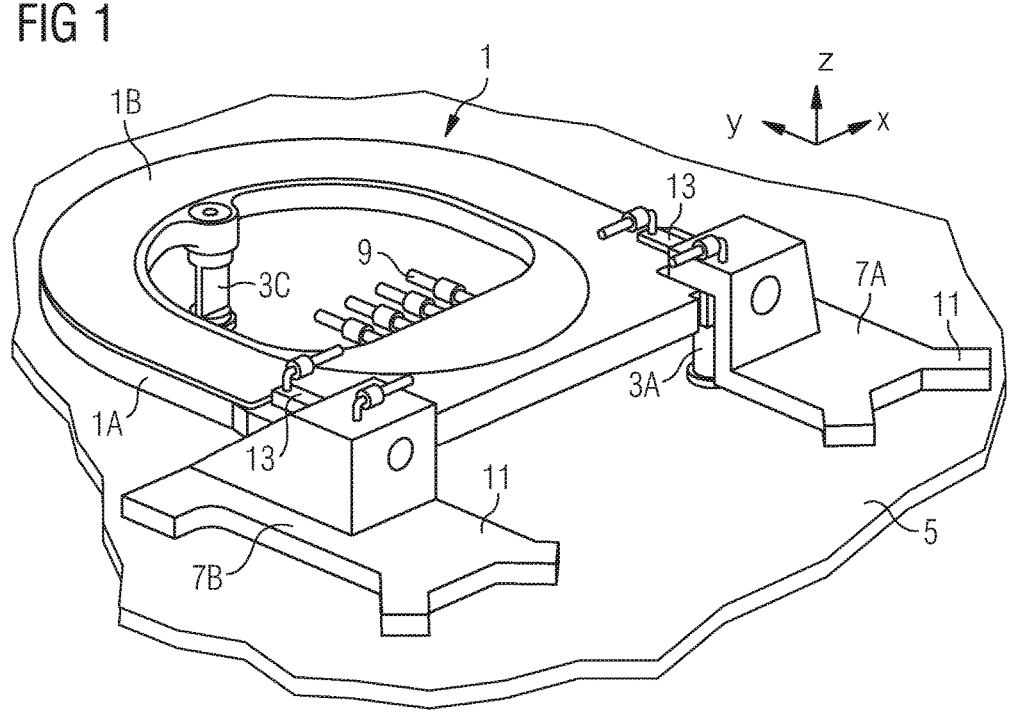
FIG. 1 is a schematic 3D illustration of a fiber mounting unit with fiber receiving elements, platforms and mounts for a high power fiber laser amplifier system.
Figure 4:
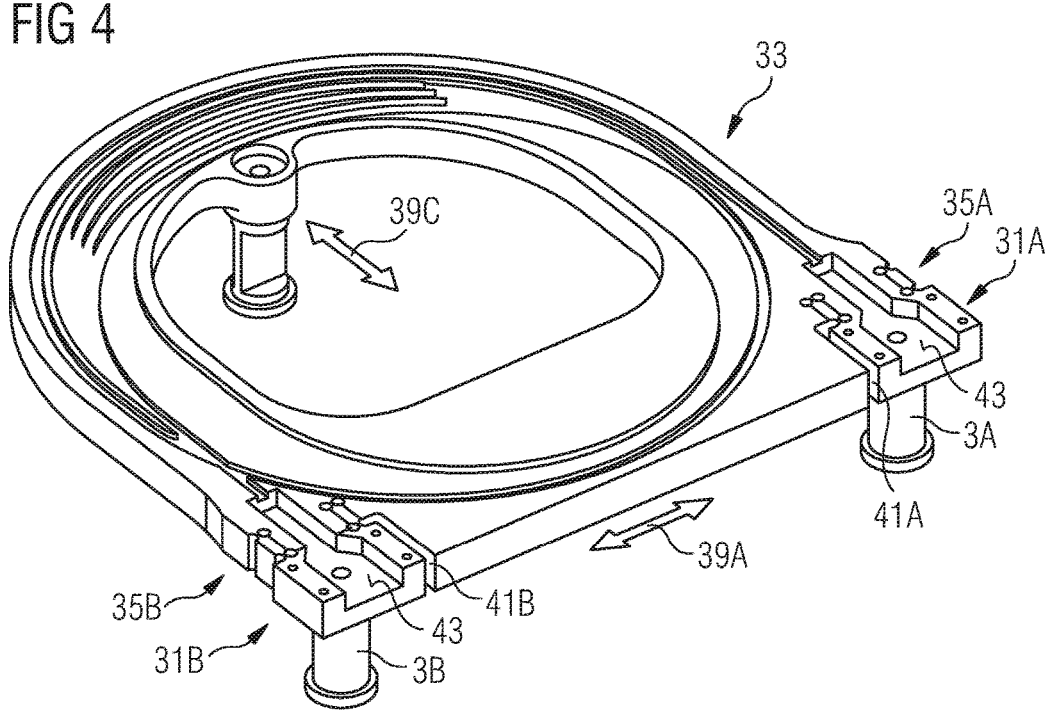
FIG. 4 is a schematic 3D illustration representation of the fiber mounting unit shown in FIG. 1 without fiber receiving elements and platforms.

FIG. 1 shows a 3D illustration of an embodiment of a fiber mounting unit 1 for a fiber laser amplifier system. The fiber mounting unit 1 has a base body 1A and a cover 1B. The fiber mounting unit 1 is mounted on an optical plate 5 (e.g., a laser support) with two rigid conventional mounts 3A, 3B (mount 3B is shown in FIG. 4) and a flexure bearing mount 3C.

Figure 2:
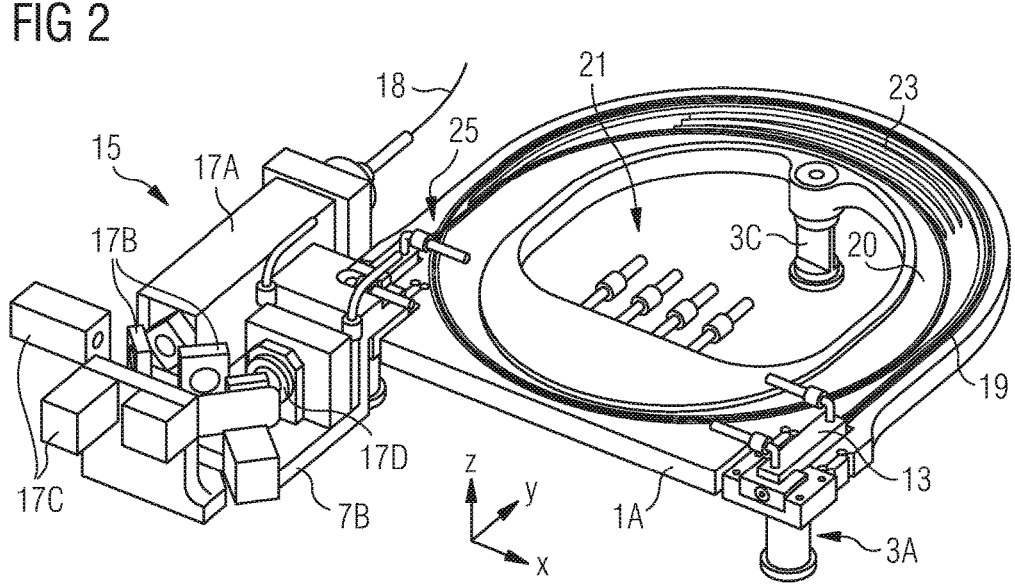
FIG. 2 is a schematic 3D illustration of the fiber mounting unit shown in FIG. 1 without cover and with a platform and optical input coupling elements.
Figure 3:
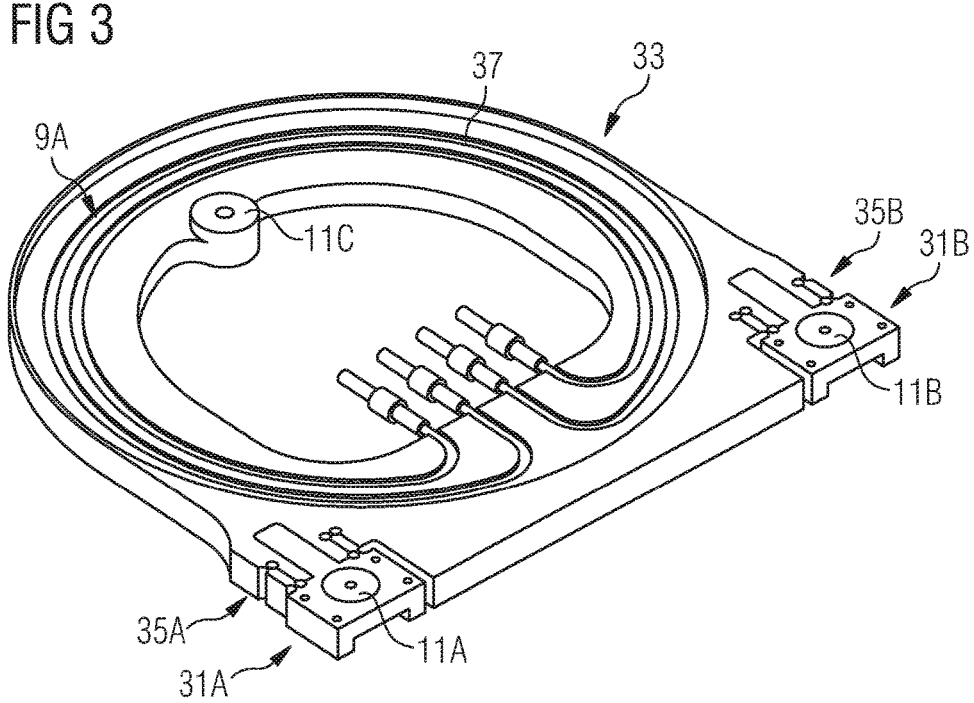
FIG. 3 is a view of a bottom side configuration of the fiber mounting unit shown in FIG. 1.

FIG. 1 shows two platforms 7A, 7B for the stationary support of optical elements, and several cooling connections 9 for supplying a cooling fluid (e.g., water) to a cooling circuit 9A (shown in detail in FIG. 3). Platforms 7A, 7B are each firmly connected to the corresponding mounts 3A, 3B (e.g., screwed) and have mounting surfaces 11 for mounting the optical elements. An arrangement of such an optical platform system is shown schematically in FIG. 2.

FIG. 1 shows two fiber receiving elements 13. The fiber receiving elements 13 each receive one of the opposite fiber ends of an optical fiber (herein also called a fiber) extending under the cover 1B of the fiber mounting unit 1. The fiber receiving elements 13 are adapted to spatially fix the fiber with respect to the corresponding mounts 3A, 3B as explained in connection with FIGS. 11A to 13.

The fiber mounting unit 1 is adapted in its dimensions to a given fiber length. The fiber usually runs circularly along a ring structure formed by the fiber mounting unit 1. The fiber mounting unit 1 can extend in each of the X- and Y-directions of the axes indicated in FIG. 1 over several tens of centimeters. For example, it can extend 30 cm for fiber lengths in the range of 180 cm. The solid base body 1A has a thickness D (shown in FIG. 8) that can be for example, 5 mm or more (e.g., 15 mm) for a fiber mounting unit made to hold such a 180 cm long fiber. The fiber mounting unit can be made of aluminum. Accordingly, the base body 1A is relatively stiff in the Z-direction, but allows a deformation caused by temperature changes. The features explained below are intended to minimize the influence of deformation on the underlying amplifier performance. The embodiments shown herein decouple a thermally-induced deformation of the base body 1A from the platforms 7A, 7B as well as from the fiber receiving elements 13.

FIG. 2 shows an example of an optical platform system 15 in which various optical elements are mounted on the corresponding mounting surface 11 of platform 7B. Examples of optical elements include an optical telescope unit 17A, deflecting mirrors 17B, beam monitoring units 17C, and a focusing lens 17D. FIG. 2 shows the base body 1A without cover 1B to illustrate the fiber path within the fiber mounting unit 1. The platform 7A is also not shown in FIG. 2 to better illustrate the position of the receiving unit 13 with respect to the mount 3A.

The optical platform system 15 is an example of free-beam seed coupling, where seed laser light is fed to the optical telescope unit 17A with an optical fiber 18, the position of the seed laser light is monitored, and the seed laser light is focused on a fiber end of an (amplifier) optical fiber 19 located in the fiber mounting unit 1. The optical platform system 15 allows a single-mode coupling. In addition, an appropriate arrangement of optical components such as position-sensitive optical components, can also be provided at a pump side such as on platform 7A in FIG. 1.

The optical fiber 19 is designed for wavelengths of approximately 1 to 3 µm with ytterbium, holmium, thulium, and/or erbium doping. In general, the optical fibers are designed to amplify light pulses with femtosecond (fs) pulse durations up to nanosecond (ns) pulse durations. Exemplary embodiments include step-index fibers, and photonic crystal fibers. Fiber core diameters range from a few micrometers to several hundred micrometers (e.g., 1 µm to 200 µm). Absorption lengths can be in the range of centimeters to the range of several meters. Resulting fiber lengths range from a few centimeters to several meters. The shorter the fiber, the lower the possible non-linear influence, but the stronger the fiber has to be pumped and the higher the thermal loads. Thermal loads are counteracted by thermal decoupling.

As shown in FIG. 2, the optical fiber 19 runs one and a half times around an inner opening 21 of the ring-type fiber mounting unit 1 in a groove 20 on the top of the base body 1A. The two ends of the optical fiber 19 are held by the receiving elements 13, so that the fiber 19 extends in the Y direction (longitudinal direction of the receiving element) in the area of the receiving elements 13. The optical fiber 19 runs between the receiving elements 13 on a fiber support surface of the groove 20 in the base body 1A. Groove 20 has a lamella structure 23 to adapt the fiber path, which allows adjusting the length of the fiber path while maintaining a guiding effect of the fiber 19. In FIG. 2, groove 20 runs along approximately 540°, similar to a tilted spiral, so that the two fiber ends are approximately at the same height, but there is no contact of the fiber 19 at a crossing point 25. The bottom of groove 20 is configured as a fiber support surface to thermally couple fiber 19 and base body 1A as much as possible.

Heat is dissipated via one or more cooling circuits 9A, as shown in FIG. 3. The cooling circuits 9A can be, for example, copper pipes 37 integrated into the base body 1A. The copper pipes 37 are arranged to follow the path of the optical fiber 19 and to lead into the cooling connections 9. Accordingly, heat can be dissipated from the cartridge area, which is heated most by the optical fiber 19 during operation. Furthermore, to improve the heat conductivity from the optical fiber 19 to the base body 1A, a heat-conducting, typically soft material such as silicone, can be introduced into the groove 20.

FIGS. 3 to 6 illustrate the structure of the base body 1A with regard to the flexure bearing concept. In the embodiment, the base body 1A has two fiber end attachment sections 31A, 31B, a fiber guide section 33, and a connection section 35A or 35B, respectively, between the fiber end attachment sections 31A, 31B and the fiber guide section 33.

The attachment to the optical plate 5 described above is made at the fiber end attachment sections 31A, 31B. Accordingly, the fiber end attachment sections 31A, 31B are provided with mounting surfaces at their bottom side 11A, 11B for fixing the mounts 3A, 3B. Furthermore, the fiber end attachment sections 31A, 31B are adapted for fixing the fiber receiving elements 13 that each hold a fiber end of the optical fiber 19, as well as for mounting the optical platform systems 15.

The fiber guide section 33 includes the features previously explained, such as the groove 20 and the lamella structure 23 for guiding a fiber central portion of the optical fiber 19.

Each of the connection sections 35A, 35B is configured as a flexure bearing in the embodiment of the high power fiber laser amplifier system. In general, a flexure bearing can be formed by appropriate material shaping. The purpose of the flexure bearing is to allow elastic deformation without plastic deformation. The flexure bearing in connection section 35A, 35B is formed by a spatial separation of the fiber guide section 33 from the fiber end attachment sections 31A, 31B by incisions 41A, 41B, and/or by material reduction. That is, material is removed laterally along the X-axis. Exemplary relief bores 42 (see FIG. 6) together with a lowering of a bottom surface 43, which can partially extend into the associated connection section, can weaken the material forming the flexure bearing. Such material modifications generally influence the degrees of freedom of the flexure bearing.

As a result, the flexure bearing provides a degree of freedom of movement of the fiber guide section 33 with respect to the fiber end attachment sections 31A, 31B in the X-Y plane. In FIG. 4 this is indicated by an arrow 39A and in FIG. 5 by arrows 39B. Due to a corresponding choice of the thickness D of the base body 1A, the flexure bearing cannot have a degree of freedom in the Z direction. Thus, thermal deformations are absorbed by relative movements in the X-Y plane at the flexure bearings of the connection sections 35A, 35B.

Figure 5:
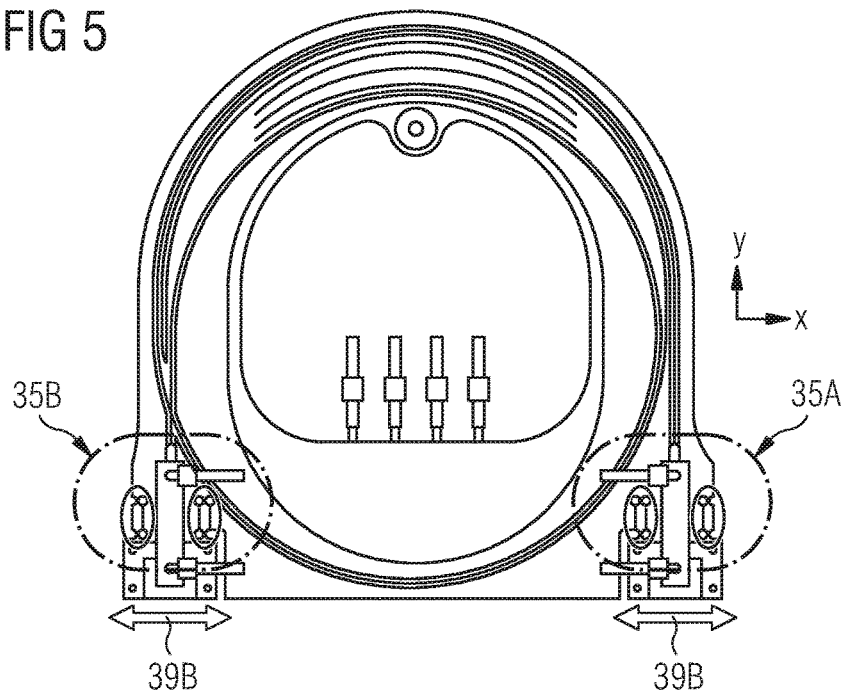
FIG. 5 is a top view of the fiber mounting unit shown in FIG. 1 with fiber receiving elements to illustrate the flexure bearing.

In FIG. 5, the areas of the connection sections 35A, 35B (dashed ovals) and the zones of lateral material weakening (solid ovals) are shown schematically.

Figure 6:
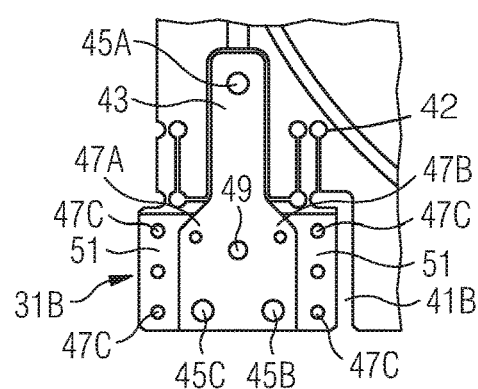
FIG. 6 is an enlarged section of a connection section with a flexure bearing.

FIG. 6 shows an enlarged view of the fiber end attachment section 31B in the area of the corresponding connection section 35B. The bottom surface 43 extends from the fiber end attachment section 31B via the connection section 35B into an edge area of the fiber guide section 33. As shown in the top view, the bottom surface 43 is narrower at the fiber guide section side in the X direction than at the input coupling side. Each of the bottom surfaces 43 has three depressions 45A, 45B, 45C as bearing surfaces for positioning balls 84A, 84B, 84C (shown in FIG. 9). The positioning balls are used for an expansion-compensated bearing and/or thermal separation of the mounting element 13.

Furthermore, the fiber end attachment section 31B is configured for mounting the receiving element 13 (for example, using two threads 47A, 47B) and for mounting to the mount 3B using a through hole 49 arranged centrally in the base surface 43. Furthermore, the bottom surface 43 is laterally bounded by side walls 51. Side walls 51 are used for mounting platforms 7A, 7B, e.g., with pin inserts and threads 47C.

An additional degree of freedom of movement of the mounting of the base body 1A in the Y direction further reduces tensions due to thermal expansion effects. In FIGS. 4 and 8, an arrow 39C indicates such an additional direction of movement for compensation of thermal changes in the fiber mounting unit 1. A flexure bearing mount 3C can accept a change of position in the Y-direction without exerting any additional force on the fiber mounting unit 1. The flexure bearing mount 3C is shown enlarged in FIG. 7, and FIG. 8 illustrates the degree of freedom (arrow 39C) provided by the flexure bearing mount 3C in a side view of the configuration shown in FIG. 4.

The flexure bearing mount 3C can be mounted on a mounting surface 11C on the fiber guide section 33 (see FIG. 3). The flexure bearing mount 3C includes a base 53 for mounting to the optical disc 5. Moreover, the flexure bearing mount 3C includes an upper part 55 for mounting to the fiber mounting unit 1 (generally to an optical component), and generally at least one flexure bearing. In the embodiment shown in FIG. 7, the flexure bearing mount 3C also has a plate-shaped central part 57 that is connected to the base 53 and to the upper part 55 via respective flexure bearings 59A, 59B.

The plate shape of the central part 57 requires a linearly extending flexure bearing, so that there is no rigidity in the Y direction for the flexure bearing mount 3C. Accordingly, an expansion in Y direction of the base body 1A leads to a slight tilting of the middle section 57 in the Y direction (accompanied by a minimal change in height).

With regard to fixing the fiber receiving elements 13, the bottom surfaces 43 of the fiber end attachment sections 31A, 31B represent spatial fixed points due to the fixed mounting at the mounts 3A, 3B. The fiber receiving elements 13 are arranged at these fixed points.

FIG. 9 shows a simplified cross-section of the fiber receiving element 13 as well as a part of the optical platform system 15 shown in FIG. 2. The focusing input coupling lens 17D is mounted in a lens holder 17D' together with a beam sleeve 17E. The fiber receiving element 13 has a bottom unit 61 extending along a longitudinal direction (the Y direction in FIG. 1) and a covering unit 63 mounted on the bottom unit 61 and at least partially covering the bottom unit 61. The covering unit 63 has a cooling channel 65 that enables active cooling of the fiber receiving element 13 via cooling connections 9'. A fiber end section 19A of the optical fiber 19, which has a fiber end 67 at the input coupling side, extends between bottom unit 61 and covering unit 63.

The lens 17D is part of a free-beam coupling that focuses a laser beam that is to be coupled in a stationary manner with respect to the fiber end attachment section 31A, 31B on a defined fiber end position (in case of a spatially fixed fiber end 67, the fiber end 67 itself). The lens 17D thus allows incident seed laser light 68A to be coupled into the optical fiber 19. An analog or simplified set-up due to the easier coupling of the pump light can be used at the pump side.

As not all pump light is usually converted for high amplifications, however, pump light 68B exits the fiber end 67 in a direction opposite to the seed laser light 68A. The exiting pump light 68B propagates within the beam sleeve 17E and can be absorbed due to its large divergence on the inner surface of the beam sleeve 17E.

FIG. 10 shows an enlarged view of the beam sleeve 17E. A cylindrical section 71 is held by a support element 73 and cylinder axis of cylinder section 71 overlap with an optical axis 68' of the seed laser light 68A. A funnel section (not shown) can be arranged next to the cylindrical section 71 in the direction of the cylinder axis.

The exiting pump beam 68B is absorbed on the inside of the cylindrical section 71, which has an absorbing layer, and strongly heats up the beam sleeve 17E. For heat dissipation, the support element 73 as shown has a cooling channel that can be connected to a cooling circuit via cooling connections 9".

An insulating element 75 can be in contact with the corresponding platform 7A, 7B and due to its low thermal conductivity thermally decouples the heated cylindrical section 71 from the platform 7A, 7B. The support element 73 can be thermally insulated from the lens holder 17D' and the lens 17D (for example, they can be spaced apart).

FIGS. 11A, 11B, 12, and 13 show an example of a fiber receiving element 13 with a specially configured bottom side for interaction with the bottom surface 43 of the fiber end attachment sections 31A, 31B via balls as explained below. Although the focus position generated by the lens 17D remains fixed with respect to the corresponding fiber end attachment section 31A, 31B or the mount 3A, 3B and the table top 5, the fiber receiving element 13 can expand or contract under different thermal conditions, so that it is not necessarily guaranteed that the fiber end 67 is also spatially fixed.

Figure 11A:
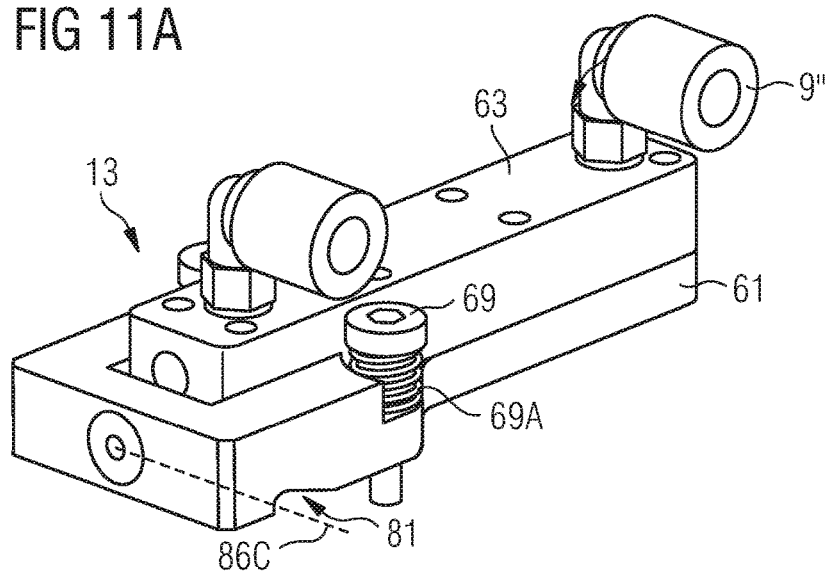
FIG. 11A and FIG. 11B are schematic 3D illustrations of a fiber receiving element for a high power fiber laser amplifier system.
Figure 11B:
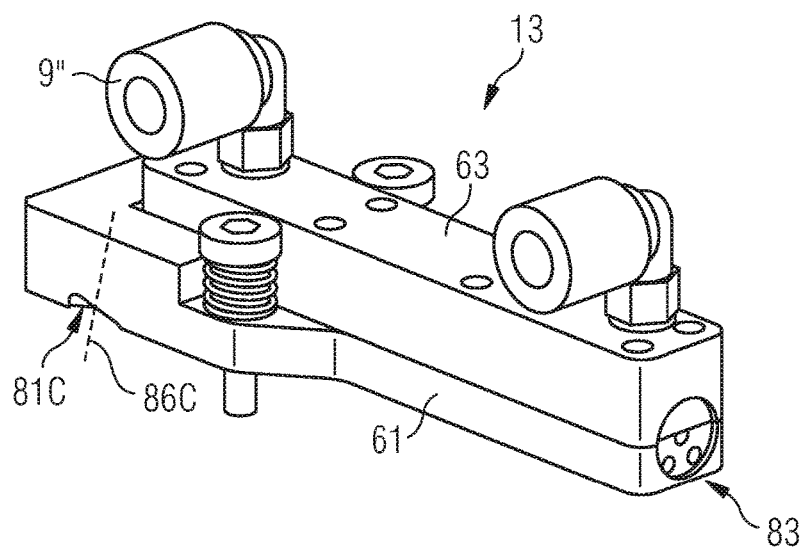

FIGS. 11A and 11B show perspective views of the fiber receiving element 13 with the cooling connections 9" originating from the covering unit 63. The covering unit 63 is firmly screwed to the bottom unit 61. Two fixing screws 69 together with compression springs 69A press the fiber receiving unit 13 onto the bottom surface 43. The position of the fixing screw 69 is explained below.

A recess 81 on the bottom side of the bottom unit 61 and openings 83 on the fiber outlet side of the receiving element 13 can be seen. The recess 81 and the openings 83 are connected to a support of the fiber receiving element 13 on the base surface 43 via balls, whereby the support causes a thermal position compensation.

Figure 13:
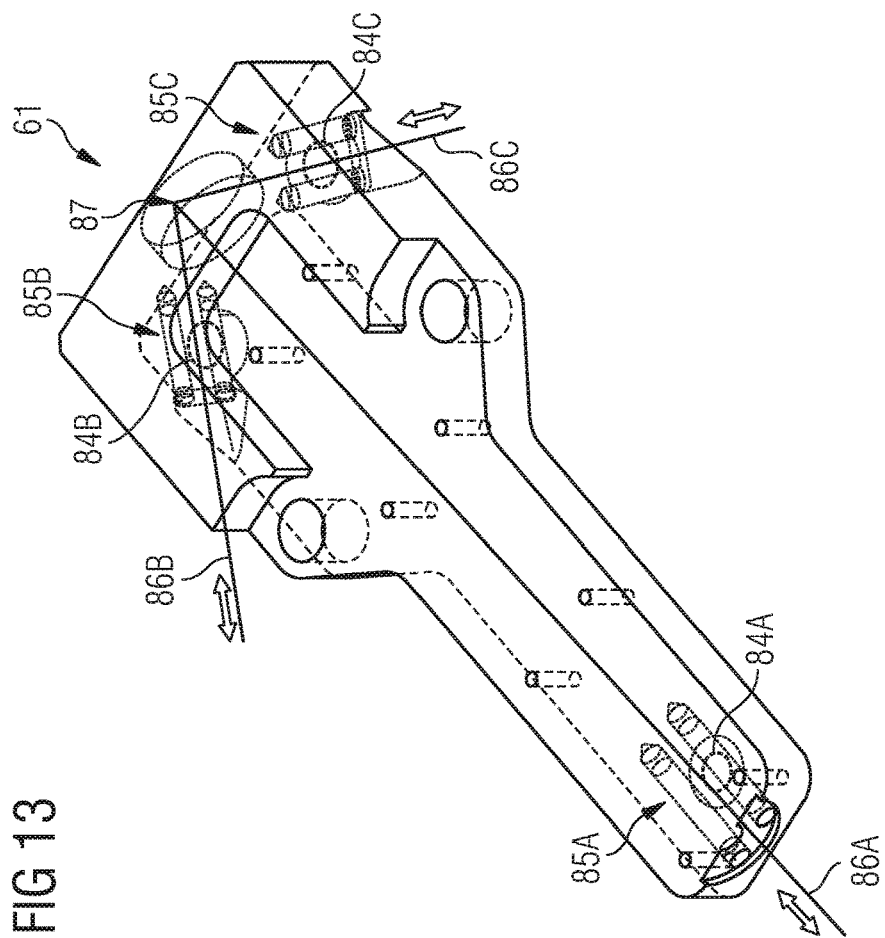
FIG. 13 is a schematic 3D illustration of the base body shown in FIG. 12 to illustrate the orientation of compensation axes.
Figure 12:
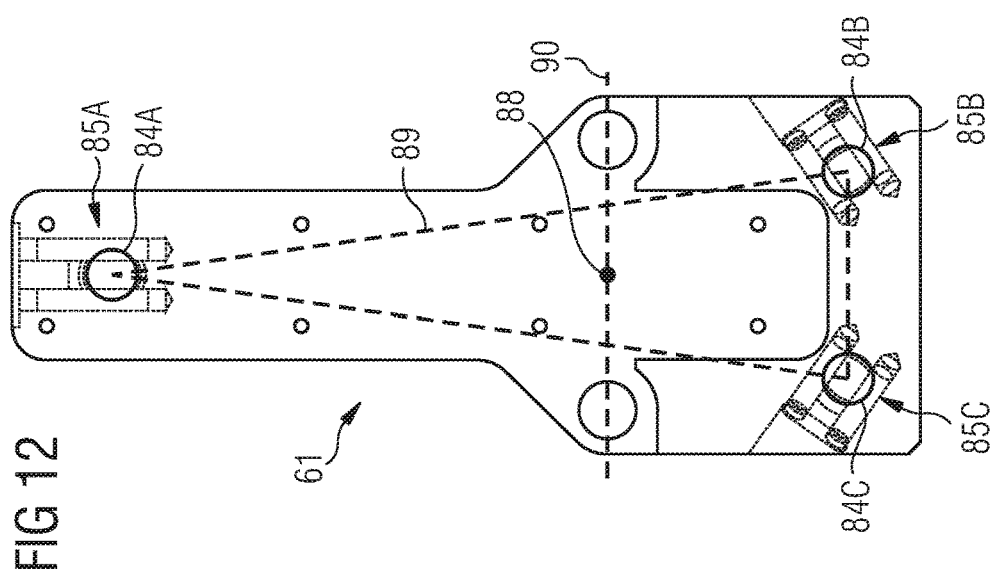
FIG. 12 is a top view onto a base body of a fiber receiving element.

Specifically, as shown in FIGS. 12 and 13, three pairs of cylindrical pins are provided to allow a three-point support on three balls 84A, 84B, 84C that align with and fit into hollows 45A, 45B, 45C of bottom surface 43.

A first pair of cylindrical pins 85A forms a first guide rail system adapted to guide a thermal expansion movement of the fiber receiving element 13 along a first axis 86A. The axis 86A is primarily aligned along the direction of the fiber end section 19A and, when the mounting element 13 is mounted, the first axis 86A is directed to a desired free-beam coupling position 87, possibly with a slight tilt to the X-Y plane of FIG. 1.

A second pair of cylindrical pins 85B forms a second guide rail system adapted to guide a thermal expansion movement along a second axis 86B. The second axis 86B extends substantially at an angle less than 90° with respect to the first axis 86A and, when the receiving element 13 is installed, the second axis 86B is directed to the free-beam coupling position 87.

As shown in FIG. 13, the second axis 86B runs from the rear (i.e., from the fiber exit side) and from below through the desired free-beam coupling position 87. The inclined orientation of the pair 85B of cylindrical pins of equal length leads in FIG. 12 to a reduced length in the drawing plane shown (see comparison with pair 85A).

A third pair 85C of cylindrical pins forms a third guide rail system designed to guide a thermal expansion movement along a third axis 86C. Similar to the second axis 86B, the third axis 86C extends substantially at an angle of less than 90° to the first axis 86A and is oriented towards the free-beam coupling position 87. The alignment of the second and third axes may be mirror-symmetrical to a Y-Z symmetry plane extending through the free-beam coupling position 87.

The three axes 86A, 86B, 86C meet in the desired free-beam coupling position 87 and form the edges of a pyramid, with the free-beam coupling position 87 being the tip of the pyramid. This orientation relative to each other causes the position of the free-beam coupling position 87 to remain essentially stationary, if the positions of the support of the bottom side on the balls 84A, 84B, 84C change in the event of a change in volume of the fiber receiving element 13 due to thermal conditions. The 84A, 84B, 84C represent fixed points, along which the bottom side of the expanding/shrinking receiving element moves. Due to the angled arrangement, in particular the tilting of axes 86B and 86C with respect to the X-Y plane, and when the support of the fiber receiving element 13 is present at a first fixed point assigned to the first guide rail (ball 84A in the corresponding hollow 45), at a second fixed point assigned to the second guide rail (ball 84B in a corresponding hollow 45), and at a third fixed point assigned to the third guide rail (ball 84C at a corresponding hollow 45), the fiber receiving element 13 is lowered when the latter expands. The fiber receiving element 13 is raised when the fiber receiving element 13 is reduced in volume. This lowering and raising takes place at the input coupling side due to expansion in the lateral direction.

In other words, the described guide rail system configuration provides height compensation, particularly with respect to the second fixed point and the third fixed point, to compensate for the change in size of the fiber receiving element 13.

The compensation movement described above requires a certain mobility of the fiber receiving element 13. This mobility can be ensured by fixing the fiber receiving element with the screws 69 and the compression springs 69A.

For example, the fixation can be made in the area of a surface center of gravity 88 of a triangle 89 spanned by the three fixed points. In the view shown in FIG. 12, the positions of the screws 69 are arranged laterally from the surface center of gravity along the X-axis, so that tilting about a transverse axis 90 is possible. The transverse axis 90 runs through the two screws 69 and the surface center of gravity 88.

In addition, by arranging the fiber end section 19A accordingly, the fiber end 67 can be positioned in the free-beam coupling position 87. Furthermore, the free-beam coupling position 87 can also be adjusted on the laser side by respective alignment of the incident seed laser beam 68A.

In addition to the previously described embodiment of a fiber mounting unit 1 for fiber laser amplifier systems with high power, a fiber mounting unit 101 for fiber laser amplifier systems with low to medium power is explained below with reference to FIGS. 14 to 17.

The fiber mounting unit 101 shown in FIG. 14 again has a base body 101A with a fiber end attachment section 131, a fiber guide section 133, and a connection section 135 configured as a flexure bearing between the fiber end attachment section 131 and the fiber guide section 133. The fiber end attachment section 131 is the seed side, i.e. a seed laser beam is fed to the fiber receiving element 113 attached to the fiber end attachment section 131 to a seed end of an amplifier fiber 119 held by the fiber receiving element 113.

In addition, the base body 101A has a stationary fiber end attachment section 131' not connected via a flexure bearing. A fiber receiving element 113' is attached to the fiber end attachment section 131', which is adapted for coupling pump light into a pump end of the amplifier fiber 119.

The base body 101A is divided into several segments in the area of the fiber guide section 133: a main segment 102A and two circular section segments 102B, 102C. The segments are connected to each other via segment connections 104. The segment connections 104 are each attached to an optical plate via a mounting unit 103 including a flexure bearing and a mount.

Figure 15:
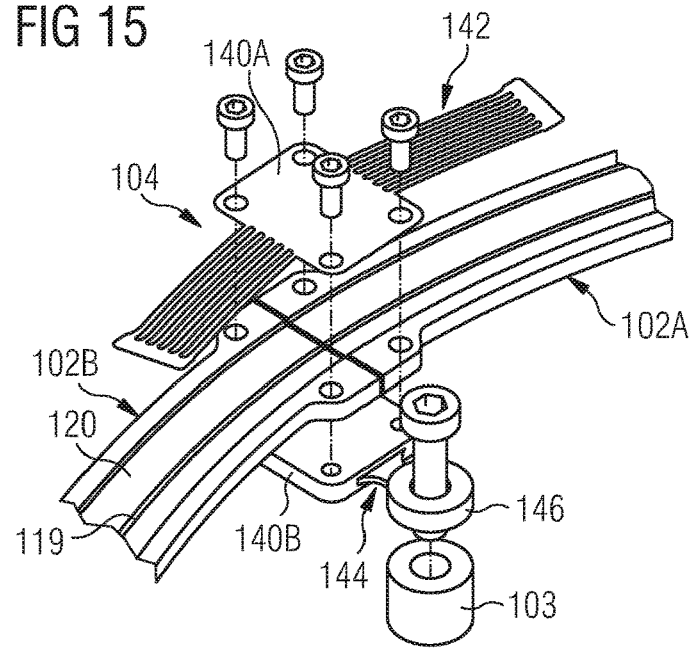
FIG. 15 is a motion restriction device for limiting a degree of freedom of a flexure bearing.

A segment connection 104 or motion restriction device is shown in detail in FIG. 15. Rail-like ring sections of the main segment 102A and of the circular section segment 102B are aligned with each other in such a way that a continuous recess 120 is formed. As explained below, the optical fiber runs in a circle at least once along the ring-shaped recess 120. The segment ends are screwed together via a cover plate 140A and a bottom plate 140B. The cover plate 140A further has a comb structure 142. The comb structure 142 has adjacent recesses in which the fiber can be arranged according to its length. The comb structure 142 can also be spring-like to provide a slight pressing force onto the fiber 119.

The lower plate 140B has a flexure bearing 144 on an inner long side. The flexure bearing 144 connects the bottom plate 140B with a mounting area 146 that can be screwed to a mount 103. The flexure bearing 144 permits thermal changes in the shape of the base body 101A without causing increased tension.

Figure 14:
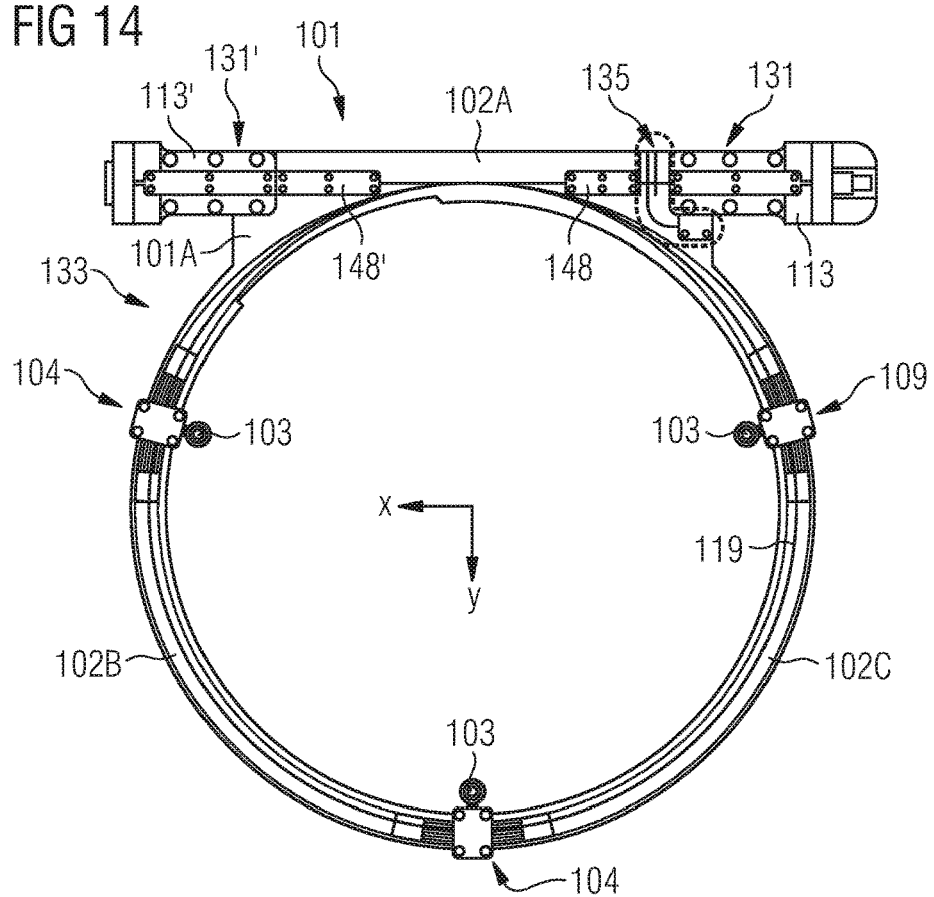
FIG. 14 a top view on a fiber mounting unit with fiber receiving elements and mounts for a low or medium power fiber laser amplifier system.
Figure 16:
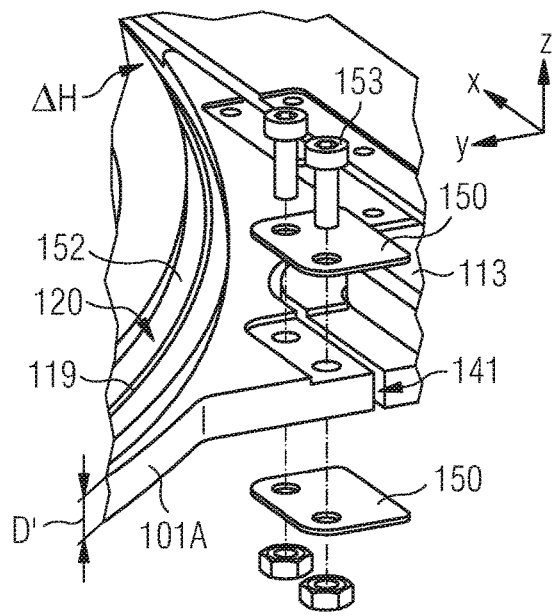
FIG. 16 is a connection configuration of two segments of the fiber mounting unit shown in FIG. 14.

Referring also to FIG. 16, similar to the high power design described above, the base body 101A, in particular the fiber guide section 133 and the recess 120 therein, also permits a circular or spiral fiber path. To ensure overlap with distance between the respective fiber sections, the receiving elements 131, 131' are configured in such a way that the fiber ends leave the fiber receiving elements with a height offset of ΔH from the size of the fiber diameter itself (e.g., 0.25 mm to e.g., 4 mm). In the embodiment shown, the two ends are thus identically aligned except for the height offset ΔH. As shown in FIG. 14, the optical fiber 119 thus completes a circle (360°).

The base body 101A is only water cooled in the area of the receiving units due to the lower performance requirements. In the area of the ring segments cooling takes place primarily via the ambient air and the heat transfer to the base, which can be made of aluminum, for example. To improve the heat transfer from the fiber to the main segment 102A, especially in the end areas, cover cooling plates 148, 148' can be provided next to the receiving elements 113, 113' (see also FIG. 17). For example, the cover cooling plate 148' can be as large as possible in the area of the receiving element at the pump side. In contrast, the cover cooling plate 148 is smaller due to incisions 141 (FIG. 16) in the area of connection section 135 (FIG. 14).

In the case of amplifier systems for low power, water cooling may not be required at all.

The low to medium powers lead to lower thermal loads on the base body 101A, so that the receiving element 113 at the seed side is decoupled from the fiber guide section 133 via a flexure bearing.

Figure 17:
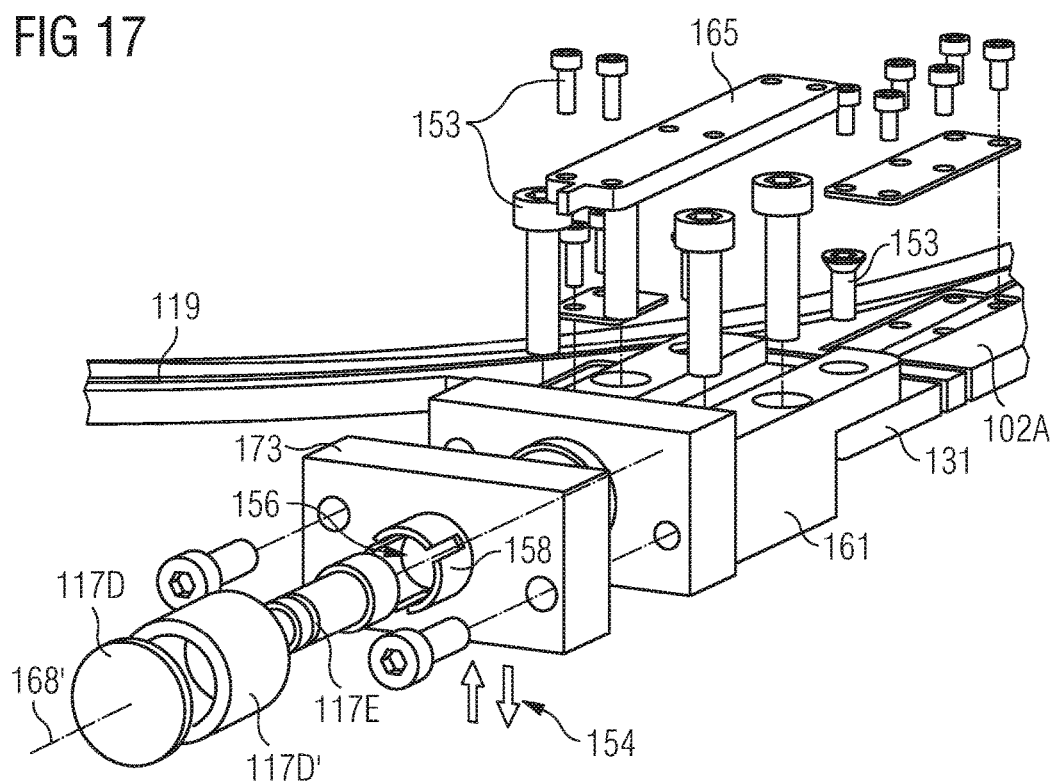
FIG. 17 is a fiber receiving element for a low or medium power fiber laser amplifier system.

As the thermal deformations of the fiber receiving elements are also lower due to the lower power, the fiber receiving elements may be screwed directly onto the fiber end attachment sections 131, 131' (see FIG. 16 and FIG. 17).

To save material, a thickness D' of the base body 101A in the Z direction can be reduced (for example, to a few millimeters). However, this can lead to a degree of freedom of movement of the flexure bearing in the Z direction. To block this degree of freedom (as shown in FIG. 16), a pair of guide plates 150 partly bridge the incision 141 and thus prevent movement in the Z direction of the fiber end attachment section 131. FIG. 16 illustrates the fixing of the guide plates 150 with screws 153. In FIG. 16, the fiber 119 extends on the supporting surface 152 of the recess 120, whereby the recess 120 tapers in the direction of the fiber receiving elements 113, 113'.

FIG. 17 shows an exploded view of the fiber receiving element 113. The fiber receiving element 113 has a bottom unit 161 and a covering unit 165. The covering unit 165 can be screwed to the bottom unit 161, and the bottom unit 161 can be screwed to the fiber end attachment section 131 with screws 153.

A support element 173 is on the input coupling side of the bottom unit 161. The support element 173 and/or the bottom unit 161 can be connected to cooling circuits, as illustrated by arrows 154.

The support element 173 has a through-hole opening 156 along the beam axis 168'. A cylindrical absorber sleeve 117E can be attached to the inner wall surface of the through hole opening 156. Usually, the mounting is especially adapted for good thermal contact. As in the high power version, the absorber sleeve 117E is used to remove the highly divergent components of the exiting pump laser light from the optical system.

On the input coupling side, a mounting ring 158 extends around the through hole opening 156. The mounting ring 158 can have several segments and is used for thermally insulated mounting of a lens holder 117D'. The lens holder 117D' has a cylindrical design so that a coupling lens 117D can be attached to its front by gluing it on.

This arrangement allows thermally decoupling the lens 117D from the absorber sleeve 117E, so that thermal influence on the lens can be reduced or even avoided.

The input coupling units disclosed herein primarily include a coupling lens system and an end cap optionally arranged at the fiber end; the latter is particularly important at higher powers. If higher laser powers in the range of several tens of watts to several hundreds of watts (average power) are generated, additional optical elements such as collimating lenses and deflection mirrors can also be mounted on the coupling unit.

Support of the receiving element via balls can cause additional thermal insulation of the receiving element from the bottom surface.

The support of the platforms may float above the table top, and can be used on one or both sides for pump laser radiation and seed laser radiation.

To improve heat dissipation, the fiber receiving element is made, for example, of a material with a high thermal conductivity (e.g., copper).

The term fiber mounting unit used herein includes inter alia (actively cooled) fiber holding cartridges, which are also referred to as fiber cooling cartridges.

In another aspect disclosed herein, a flexure bearing mount has a base for attaching it to an optical plate and an upper part for attaching it to an optical component, and at least one flexure bearing. In some embodiments, a flexure bearing mount also has a central part, one end of which is connected to the base and the other end to the upper part via a flexure bearing, respectively.

In some embodiments, an absorber sleeve can be positioned such that light exiting from the fiber end is intercepted. The absorber sleeve has—arranged on a support element—a cylindrical section and/or a funnel section. An acute end of the funnel section can have an opening arranged with respect to the fiber end position such that light exiting from the fiber end propagates primarily within the beam sleeve, and/or wherein the support element has a cooling structure connectable with cooling ports, and/or is mounted via an insulating element to the platform.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. In addition, it is explicitly stated that all features disclosed in the description and/or the claims are intended to be disclosed separately and independently from each other for the purpose of original disclosure as well as for the purpose of restricting the claimed invention independently of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention as limits of value ranges.

What is claimed is:

1. A fiber mounting unit for supporting an optical fiber for a fiber laser system, the fiber mounting unit comprising:
    a base body extending in a plane and comprising:
        a fiber end attachment section configured to attach a receiving element that receives a fiber end portion of the optical fiber,
        a fiber guide section configured to guide a fiber central portion of the optical fiber and including a fiber support surface for arranging the optical fiber on the fiber support surface in a ring shape, and
        a connection section arranged between the fiber end attachment section and the fiber guide section, wherein the connection section is formed as a flexure bearing that provides a degree of freedom of movement of the fiber guide section with respect to the fiber end attachment section in the plane.

2. The fiber mounting unit of claim 1, wherein the flexure bearing is formed by spatially separating the fiber guide section and the fiber end attachment section and by material reduction in the connection section.

3. The fiber mounting unit of claim 1, wherein the fiber end attachment section has depressions arranged on an upper side as supporting surfaces for positioning balls of the receiving element and thereby attach the receiving element.

4. The fiber mounting unit of claim 3, wherein the fiber end attachment section is configured to attach a platform for receiving optical elements.

5. The fiber mounting unit of claim 4, wherein the fiber end attachment section comprises a recessed bottom surface bounded by side walls and wherein the depressions are in the bottom surface and the side walls attach to the platform.

6. The fiber mounting unit of claim 1, wherein the fiber end mounting portion comprises a mounting surface for attaching a mount.

7. The fiber mounting unit of claim 1, wherein the fiber guide section further comprises a cooling circuit extending at least in a section along an optical fiber path.

8. The fiber mounting unit of claim 1, wherein the fiber guide section further comprises a groove structure for receiving the optical fiber, wherein the groove structure has a lamella structure for adapting a diameter of an optical fiber path to a fiber length, and the fiber mounting unit comprises a cover.

9. The fiber mounting unit of claim 1, wherein the base body further comprises a second fiber end attachment section connected to the fiber guide section as a part of the fiber guide section.

10. The fiber mounting unit of claim 1, wherein the fiber guide section comprises a main segment having the fiber end attachment section, at least one circular segment section, and one or more segment connections, wherein a segment connection comprises a comb structure pressing the optical fiber onto a fiber support surface for adapting a diameter of an optical fiber path to a fiber length.

11. The fiber mounting unit of claim 1, further comprising a motion restriction device between the fiber end attachment section and the fiber guide section, wherein the motion restriction device allows a desired degree of freedom of movement and restricts an undesired degree of freedom of movement.

12. A fiber laser unit comprising
an optical plate,
a fiber mounting unit having a fiber guide section and a fiber end attachment section of claim 1,
an optical fiber, and
a fiber receiving element comprising:
a bottom unit extending along a longitudinal direction, wherein the bottom unit is configured for attachment to a fiber end attachment section of a fiber mounting unit, and
a covering unit mountable on the bottom unit to at least partially cover the bottom unit,
wherein the bottom unit and the covering unit are configured to receive an end portion of the optical fiber in a linear recess so that the end portion extends along the longitudinal direction and a fiber end of the optical fiber is positionable at a coupling side of the bottom unit in a free-beam coupling position, and
wherein the receiving unit is configured to receive an end of the optical fiber and the receiving element is attached to the fiber end attachment section.

13. The fiber laser unit of claim 12, further comprising
at least one rigid mount and
at least one flexure bearing mount attaching the optical plate to the fiber guide section, the flexure bearing mount having a flexure bearing that allows relative movement of the fiber mounting unit with respect to the optical plate due to thermal deformation of the fiber mounting unit, and
wherein the flexure bearing provides a degree of freedom that is not provided by the flexure bearing of a connection section of the fiber mounting unit.

14. The fiber laser unit of claim 12, further comprising an optical platform system fixedly connected to the fiber end attachment section of the fiber mounting unit, and
a platform supporting optical elements, wherein the optical elements focus a laser beam stationary with respect to the fiber end attachment section onto a defined fiber end position, and
wherein the free-beam coupling comprises an optical telescope, a deflecting mirror, a focusing coupling lens, and/or an absorber sleeve.

15. The fiber laser unit of claim 12, wherein the bottom unit, the covering unit, or both the bottom unit and the covering unit are made of a heat dissipating material.

16. The fiber laser unit of claim 12, further comprising:
a support unit attachable to the bottom unit on a coupling side for attaching an absorber sleeve,
wherein the support unit has a through hole opening in the extension direction of the end section and of the linear recess, and
wherein the absorber sleeve extends away from the bottom unit out of the through hole opening and is attachable to an inner wall side of the through hole opening.

17. The fiber laser unit of claim 12, further comprising:
a support unit attachable to the bottom unit on a coupling side for attaching a lens unit,
wherein the support unit has a through hole opening in the extension direction of the end section and of the linear recess, and
wherein the lens unit comprises a focusing lens and a cylindrically shaped lens holder and the support unit is configured to mount the lens holder such that the focusing lens is arranged in extension of the linear recess.

18. The fiber laser unit of claim 12, further comprising a support unit attachable to the bottom unit on a coupling side, wherein the support unit and/or the bottom unit has a cooling structure connectable to cooling connections.

19. The fiber laser unit of claim 12, wherein the covering unit has a cooling structure connectable to coolant connections.

20. The fiber laser unit of claim 12, wherein the bottom unit further comprises:
a first guide rail system configured to guide a thermal expansion movement of the fiber receiving element along a first axis, wherein the first axis is oriented substantially in the direction of the end portion,
a second guide rail system configured to guide a thermal expansion movement along a second axis, wherein the second axis is oriented substantially at an angle less than 90° with respect to the first axis, and
a third guide rail system configured to guide a thermal expansion movement along a third axis, wherein the third axis is oriented substantially at an angle less than 90° with respect to the first axis, and
wherein the second axis and the third axis each extend from the free-beam coupling position towards a support side of the bottom unit.

21. The fiber laser unit of claim 20, wherein the first, second, and third axes intersect at the free-beam coupling position that remains substantially stationary in the presence of a thermally-induced change in volume of the fiber receiving element by a lowering or lifting of the fiber receiving element with respect to a second fixed point and a third fixed point, when the fiber receiving element is supported at the first fixed point associated with the first guide rail, at the second fixed point associated with the second guide rail, and at the third fixed point associated with the third guide rail.

22. The fiber laser unit of claim 21, wherein the fiber receiving element is configured as a mount that tolerates a change in volume and the lowering or lifting of the fiber receiving element at the coupling side provides a mounting force in a region of a center of gravity formed by the three fixed points.

\* \* \* \* \*